(No Model.)
D. W. DUNN.
AUTOMATIC CIRCUIT CONTROLLER FOR ELECTRIC PUMPS.
No. 567,023. Patented Sept. 1, 1896.
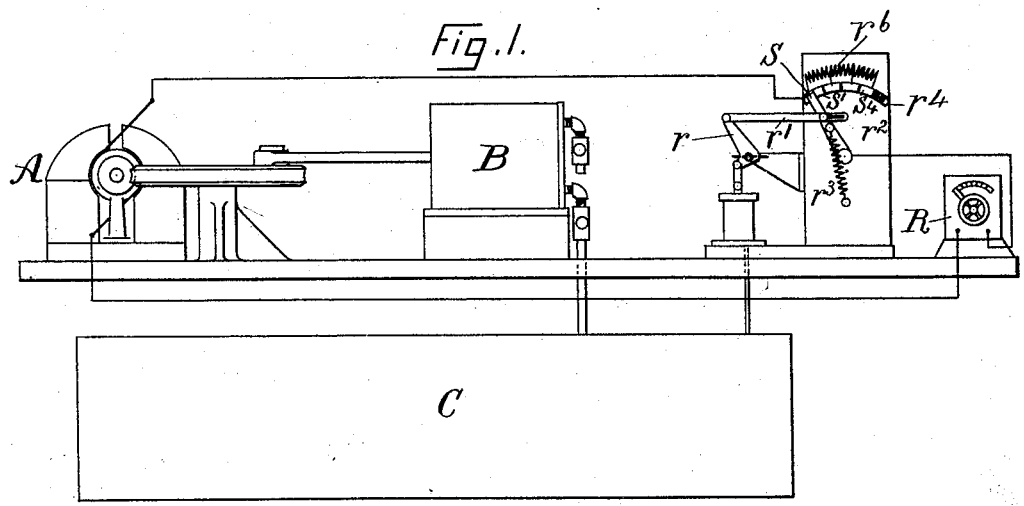
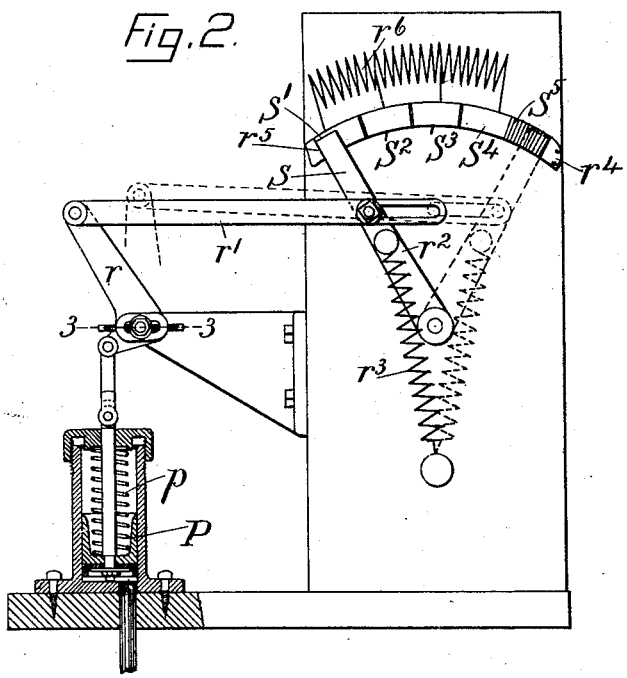
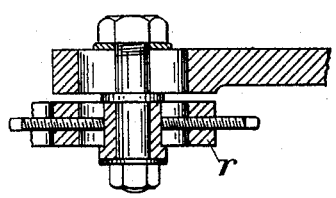
WITNESSES:
John R. Snow
H. P. Guillo
INVENTOR
David Whitney Dunn
BY
ATTORNEY.

UNITED STATES PATENT OFFICE.

DAVID WHITNEY DUNN, OF WRENTHAM, MASSACHUSETTS.

AUTOMATIC CIRCUIT-CONTROLLER FOR ELECTRIC PUMPS.

SPECIFICATION forming part of Letters Patent No. 567,023, dated September 1, 1896.

Application filed May 1, 1895. Serial No. 547,763. (No model.)

*To all whom it may concern:*

Be it known that I, DAVID WHITNEY DUNN, of Wrentham, in the county of Norfolk and State of Massachusetts, have invented a new and useful Automatic Circuit-Controller for Electric Pumps, of which the following is a specification, reference being had to the accompanying drawings, in which—

Figure 1 is a diagram illustrating my invention as applied to an air-pump for air-brakes for electrically-propelled vehicles. Fig. 2 is an elevation of one form of my automatic circuit-closer. Fig. 3 is a section on line 3 3 of Fig. 2.

My invention is an automatic circuit-closer controlled by a piston exposed to the pressure of air compressed in a reservoir by a pump which is driven by an electric motor, the moving member of the circuit-closer being organized with the other parts of the mechanism of the circuit-closer in such fashion that the current passing to the motor will be gradually reduced to a certain point by the introduction into the circuit of a resistance, and after reaching this point the circuit will be opened by the operation of a spring and independently of the piston and its connections, and, conversely, upon a fall of pressure in the reservoir the current passing to the motor will be gradually increased by the taking out of the circuit of resistance, and, finally, all resistance will be removed from the circuit by the operation of a spring. The practical result of the organization (see Fig. 2) is that the moving member S in operating to stop the motor passes from $S^3$ to $S^5$ with the utmost possible rapidity, thus preventing sparking, which would take place if member S were slowly moved from $S^3$ to $S^2$ and from $S^2$ to $S^3$.

In the drawings, A indicates the motor, B the pump driven by it, and C a reservoir supplied by the pump, and in that form of my invention shown in the drawings the pump is an air-pump and the reservoir C requires to be supplied with compressed air at a desired normal pressure. The circuit of the motor is fully closed by moving the member S of the switch to make contact with the block S', and to do this automatically, slowly, and without sparking whenever the pressure falls too low is the object of my invention.

The moving member S is connected with the piston P, and that piston is connected with the reservoir C, so that when the pressure in the reservoir is below the desired amount the piston will be moved in direction to supply current to the motor, and when the pressure in the reservoir reaches the desired amount the piston will be moved in direction to shut off that supply.

In that form of my invention shown in the drawings the switch will be fully closed when there is no pressure in the reservoir C. For example, when the car has not been used for a considerable time, but as soon as the trolley is in contact with the trolley-wire, motor A will drive pump B until the pressure in reservoir C has reached the normal amount desired, when the piston P will be moved far enough to cause bell-crank lever $r$ to move link $r'$ sufficiently to throw lever $r^2$ past its dead-center, when spring $r^3$ will carry lever $r^2$ against stop $r^4$, thereby shutting off the supply of current to motor A, the $S^5$ being insulated; but when the brakes are applied, or for any other reason there is a rapid fall of pressure in reservoir C, piston P is moved in the opposite direction and lever $r^2$ will be brought back to its dead-center and slightly beyond, when the spring $r^3$ will carry it against stop $r^5$, thereby making contact between S and S' and fully renewing the supply of current to motor A.

The pressure in reservoir C will rise rapidly while the motor A is supplied with the proper current, but as soon as lever $r^2$ has reached block $S^4$ the current must pass through resistance-coils $r^6$, and, conversely, when lever $r^2$ is pulled back from stop $r^4$ contact first occurs between S and $S^4$ and the current is through resistance-coils $r^6$ until lever $r^2$ brings S and S' into contact; but while the coils $r^6$ are desirable, for reasons which will be plain to all skilled in the art, they are not essential, as the proper resistance may be otherwise obtained, the functions of coils $r^6$ being to prevent injury to the motor, as will be fully understood by all skilled in the art.

The rheostat R in Fig. 1 is for use when the reservoir is empty and the motor A is about to be started to fill it.

In case of leakage the pressure in the reservoir C may fall so slowly that when S and $S^4$ are in contact the current through the motor will be sufficient to restore the pressure, and in that case S will return to stop $r^4$ under the influence of spring $r^3$.

Piston P is moved on its back stroke by the spring $p$, as will be obvious.

What I claim as my invention is—

1. The apparatus above described comprising an electric motor; a pump driven by it; a reservoir supplied by the pump; a piston exposed to the pressure of the air in the reservoir and a switch whose moving member is moved up to a dead-point by the piston and beyond that dead-point by power stored up during its motion up to the dead-point, all combined and operating substantially as described.

2. In combination member S; segments connected with resistance-coils; spring $r^3$; slotted link $r'$; and automatic means for moving member S to and beyond its central position through slotted link $r'$, all organized and operating substantially as described.

DAVID WHITNEY DUNN.

Witnesses:
JOHN R. SNOW,
O. R. MITCHELL.